United States Patent
Wang

(10) Patent No.: US 12,489,599 B2
(45) Date of Patent: Dec. 2, 2025

(54) METHOD AND APPARATUS FOR INTEGRATION-BASED TIMING RECOVERY

(71) Applicant: Samsung Electronics Co., Ltd., Gyeonggi-do (KR)

(72) Inventor: Tianyu Wang, San Jose, CA (US)

(73) Assignee: Samsung Electronics Co., Ltd. (KR)

(*) Notice: Subject to any disclaimer, the term of this patent is extended or adjusted under 35 U.S.C. 154(b) by 182 days.

(21) Appl. No.: 18/539,638

(22) Filed: Dec. 14, 2023

(65) Prior Publication Data

US 2025/0132891 A1 Apr. 24, 2025

Related U.S. Application Data

(60) Provisional application No. 63/591,231, filed on Oct. 18, 2023.

(51) Int. Cl.
*H04L 7/00* (2006.01)
*H04L 7/033* (2006.01)

(52) U.S. Cl.
CPC .......... *H04L 7/0054* (2013.01); *H04L 7/0012* (2013.01); *H04L 7/0337* (2013.01)

(58) Field of Classification Search
CPC .... H04L 7/0054; H04L 7/0012; H04L 7/0337
See application file for complete search history.

(56) References Cited

U.S. PATENT DOCUMENTS

| | | | |
|---|---|---|---|
| 7,764,759 B2 | 7/2010 | Gupta et al. | |
| 8,249,207 B1* | 8/2012 | Hissen | H03L 7/0807 |
| | | | 375/375 |
| 8,537,953 B2 | 9/2013 | Lin | |
| 9,025,702 B2* | 5/2015 | McLeod | H04B 10/695 |
| | | | 375/317 |
| 9,209,962 B1* | 12/2015 | Mishra | H04B 1/40 |
| 11,032,055 B1 | 6/2021 | Tseng | |
| 11,277,254 B2 | 3/2022 | Lee et al. | |
| 11,456,749 B2 | 9/2022 | Hung et al. | |
| 2009/0086872 A1* | 4/2009 | Liu | H03L 7/091 |
| | | | 375/371 |
| 2015/0234423 A1* | 8/2015 | Shvydun | G06F 1/12 |
| | | | 713/501 |
| 2016/0373240 A1 | 12/2016 | Mobin et al. | |
| 2019/0377378 A1* | 12/2019 | Gharibdoust | H03L 7/0807 |
| 2023/0254106 A1 | 8/2023 | Van Ierssel | |

* cited by examiner

*Primary Examiner* — Freshteh N Aghdam
(74) *Attorney, Agent, or Firm* — The Farrell Law Firm, P.C.

(57) ABSTRACT

A method and an apparatus are provided in which at least one data slicer of a receiver samples a signal based on a clock sampling position to obtain a first data sample and a second data sample. An integrator of the receiver integrates the signal from the first data sample to the second data sample to generate an integrated voltage. A first data slicer of the receiver samples the integrated voltage at a time of the second data sample to obtain an integrated sample. A phase detector of the receiver determines whether the clock sampling position requires adjustment based on a sign of the integrated sample.

20 Claims, 9 Drawing Sheets

METHOD AND APPARATUS FOR INTEGRATION-BASED TIMING RECOVERY

CROSS-REFERENCE TO RELATED APPLICATION

This application claims the priority benefit under 35 U.S.C. § 119 (c) of U.S. Provisional Application No. 63/591,231, filed on Oct. 18, 2023, the disclosure of which is incorporated by reference in its entirety as if fully set forth herein.

TECHNICAL FIELD

The disclosure generally relates to a high-speed communication link. More particularly, the subject matter disclosed herein relates to improvements to methods for recovering a correct phase of a data sample in the receiver of the high-speed communication link.

SUMMARY

In a high-speed communication link, a receiving device may include a timing recovery module that is responsible for providing a sampling clock, which samples data from a position in a received signal determined with respect to a telecommunication eye diagram. The eye diagram illustrates a series of "eyes" between a pair of rails when a repetitively sampled digital signal is applied to a y-axis and a data rate is applied to an x-axis. This timing recovery module of the receiving device may be referred to as clock and data recovery (CDR) module. An early clock sampling position or a late clock sampling position within the eye diagram may lead to less than ideal voltage and timing margins.

To solve this problem, the CDR module may determine a preferred clock sampling position having larger voltage and timing margins. Accordingly, a CDR module may determine whether a current clock position is early or late, and adjust a clock position to a center position of an "eye" in the eye diagram based on the determination.

Issues with conventional approaches include the use of more clock phases than are needed for data sampling (e.g., a 'baud-rate' operation), the need for inter-symbol interference (ISI) on the input data, and/or required transition patterns. A transition refers to a change in the data ($D_n \neq D_{n+1}$), and a specific transition pattern has an extra requirement on the data neighboring the transition. Conventional approaches may also require an undetermined threshold voltage, and more than one sampler dedicated to phase detection.

To overcome these issues, the present disclosure determines a correct clock sampling phase in the receiver using an integrator on the timing path, which negates the need for an extra clock sampling phase, ISI, specific transition patterns, and a digital-to-analog converter (DAC) or adaptation.

In an embodiment, a method is provided in which at least one data slicer of a receiver samples a signal based on a clock sampling position to obtain a first data sample and a second data sample. An integrator of the receiver integrates the signal from the first data sample to the second data sample to generate an integrated voltage. A first data slicer of the receiver samples the integrated voltage at a time of the second data sample to obtain an integrated sample. A phase detector of the receiver determines whether the clock sampling position requires adjustment based on a sign of the integrated sample.

In an embodiment, an apparatus is provided having at least one data slicer configured to sample a signal based on a clock sampling position to obtain a first data sample and a second data sample. The apparatus also includes an integrator configured to integrate the signal from the first data sample to the second data sample to generate an integrated voltage. The apparatus also includes a first data slicer configured to sample the integrated voltage at a time of the second data sample to obtain an integrated sample. The apparatus further includes a phase detector configured to determine whether the clock sampling position requires adjustment based on a sign of the integrated sample.

In an embodiment, an apparatus is provided that includes a processor and a non-transitory computer readable storage medium storing instructions. When executed, the instructions cause the processor to sample a signal based on a clock sampling position to obtain a first data sample and a second data sample, and integrate the signal from the first data sample to the second data sample to generate an integrated voltage. The instructions also cause the processor to sample the integrated voltage at a time of the second data sample to obtain an integrated sample, determine whether the clock sampling position requires adjustment based on a sign of the integrated sample, and adjust the clock sampling position to increase a timing margin and a voltage margin.

BRIEF DESCRIPTION OF THE DRAWING

In the following section, the aspects of the subject matter disclosed herein will be described with reference to exemplary embodiments illustrated in the figures, in which.

DETAILED DESCRIPTION

Figure 1:
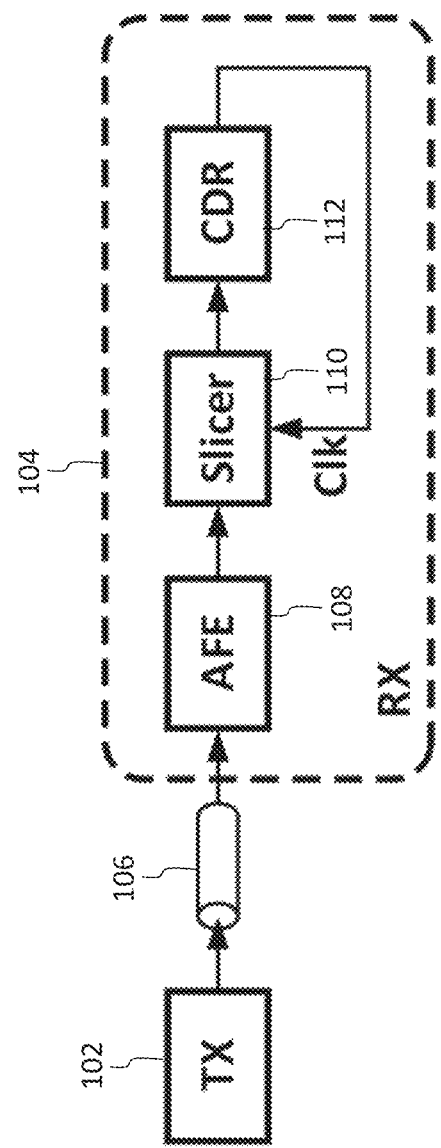
FIG. 1 is a diagram illustrating a high-speed communication link, according to an embodiment.

In the following detailed description, numerous specific details are set forth in order to provide a thorough understanding of the disclosure. It will be understood, however, by those skilled in the art that the disclosed aspects may be practiced without these specific details. In other instances, well-known methods, procedures, components and circuits have not been described in detail to not obscure the subject matter disclosed herein.

Reference throughout this specification to "one embodiment" or "an embodiment" means that a particular feature, structure, or characteristic described in connection with the embodiment may be included in at least one embodiment disclosed herein. Thus, the appearances of the phrases "in one embodiment" or "in an embodiment" or "according to one embodiment" (or other phrases having similar import) in various places throughout this specification may not necessarily all be referring to the same embodiment. Furthermore, the particular features, structures or characteristics may be combined in any suitable manner in one or more embodiments. In this regard, as used herein, the word "exemplary" means "serving as an example, instance, or illustration." Any embodiment described herein as "exemplary" is not to be construed as necessarily preferred or advantageous over other embodiments. Additionally, the particular features, structures, or characteristics may be combined in any suitable manner in one or more embodiments. Also, depending on the context of discussion herein, a singular term may include the corresponding plural forms and a plural term may include the corresponding singular form. Similarly, a hyphenated term (e.g., "two-dimensional," "pre-determined," "pixel-specific," etc.) may be occasionally interchangeably used with a corresponding non-hyphenated version (e.g., "two dimensional," "predetermined," "pixel specific," etc.), and a capitalized entry (e.g., "Counter Clock," "Row Select," "PIXOUT," etc.) may be interchangeably used with a corresponding non-capitalized version (e.g., "counter clock," "row select," "pixout," etc.). Such occasional interchangeable uses shall not be considered inconsistent with each other.

Also, depending on the context of discussion herein, a singular term may include the corresponding plural forms and a plural term may include the corresponding singular form. It is further noted that various figures (including component diagrams) shown and discussed herein are for illustrative purpose only, and are not drawn to scale. For example, the dimensions of some of the elements may be exaggerated relative to other elements for clarity. Further, if considered appropriate, reference numerals have been repeated among the figures to indicate corresponding and/or analogous elements.

The terminology used herein is for the purpose of describing some example embodiments only and is not intended to be limiting of the claimed subject matter. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

It will be understood that when an element or layer is referred to as being on, "connected to" or "coupled to" another element or layer, it can be directly on, connected or coupled to the other element or layer or intervening elements or layers may be present. In contrast, when an element is referred to as being "directly on," "directly connected to" or "directly coupled to" another element or layer, there are no intervening elements or layers present. Like numerals refer to like elements throughout. As used herein, the term "and/or" includes any and all combinations of one or more of the associated listed items.

The terms "first," "second," etc., as used herein, are used as labels for nouns that they precede, and do not imply any type of ordering (e.g., spatial, temporal, logical, etc.) unless explicitly defined as such. Furthermore, the same reference numerals may be used across two or more figures to refer to parts, components, blocks, circuits, units, or modules having the same or similar functionality. Such usage is, however, for simplicity of illustration and case of discussion only; it does not imply that the construction or architectural details of such components or units are the same across all embodiments or such commonly-referenced parts/modules are the only way to implement some of the example embodiments disclosed herein.

Unless otherwise defined, all terms (including technical and scientific terms) used herein have the same meaning as commonly understood by one of ordinary skill in the art to which this subject matter belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

As used herein, the term "module" refers to any combination of software, firmware and/or hardware configured to provide the functionality described herein in connection with a module. For example, software may be embodied as a software package, code and/or instruction set or instructions, and the term "hardware," as used in any implementation described herein, may include, for example, singly or in any combination, an assembly, hardwired circuitry, programmable circuitry, state machine circuitry, and/or firmware that stores instructions executed by programmable circuitry. The modules may, collectively or individually, be embodied as circuitry that forms part of a larger system, for example, but not limited to, an integrated circuit (IC), system on-a-chip (SoC), an assembly, and so forth.

FIG. 1 is a diagram illustrating a high-speed communication link, according to an embodiment. A transmitter 102 and a receiver 104 may be connected by a high-speed channel or link 106. The receiver 104 may include an analog front end (AFE) module 108 that receives a data signal via the high-speed channel or link 106. The AFE may provide equalization and gain stages to optimize the data signal for symbol detection or quantization. After front end processing, the signal may be provided to a data slicer 110 (or sampler), which samples and compares the data signal to a threshold based on a clock sampling position (Clk). A CDR module 112, which includes a phase detector, may correct and recover the clock sampling position (Clk), which may be provided back to the data slicer 110 for data sampling.

Figure 2B:
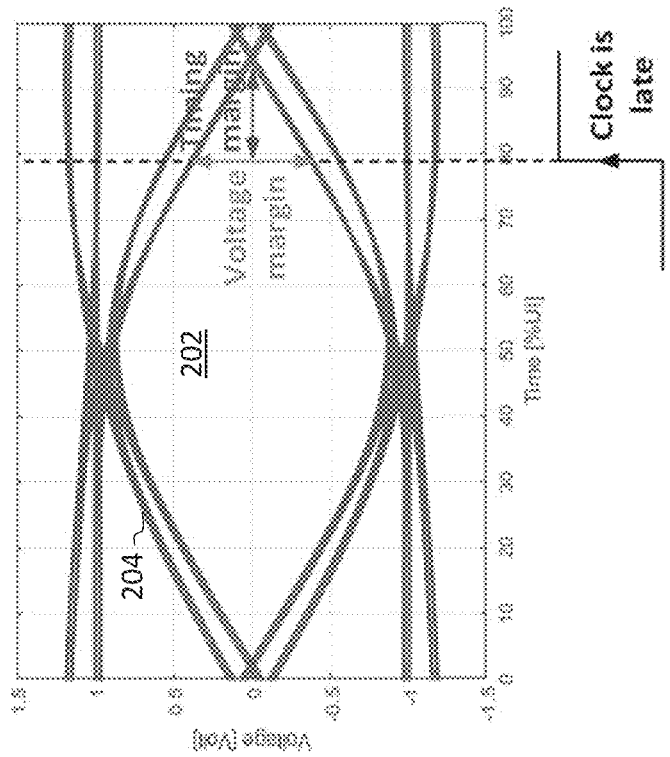
FIG. 2B is a diagram illustrating a late clock sampling position on a telecommunication eye diagram, according to an embodiment.
Figure 2A:
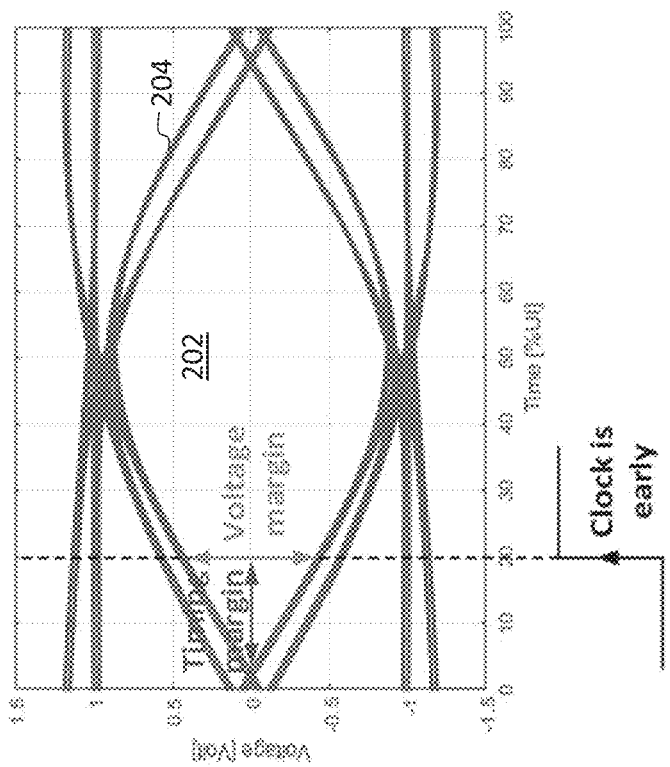
FIG. 2A is a diagram illustrating an early clock sampling position on a telecommunication eye diagram, according to an embodiment.

FIG. 2A is a diagram illustrating an early clock sampling position on a telecommunication eye diagram, according to an embodiment. The eye diagram illustrates an "eye" 202 formed from voltages of a repetitively sampled digital signal 204 on a y-axis and a data transmission rate (% unit interval (UI)) on an x-axis. The UI is the time taken in a data stream by each subsequent pulse or symbol. The clock sampling position is shown at approximately 20% UI, which demonstrates a reduced timing margin from the start of the "eye" 202 in the x-domain and a reduced voltage margin within the "eye" 202 in the y-domain, when compared to a preferred clock sampling position at the center of the "eye" 202.

FIG. 2B is a diagram illustrating a late clock sampling position on a telecommunication eye diagram, according to an embodiment. The clock sampling position is shown at approximately 80% UI, which demonstrates a reduced timing margin from an end of the "eye" in the x-domain and a reduced voltage margin within the "eye" in the y-domain, when compared to a preferred clock sampling position at the center of the "eye" 202.

Figure 3:
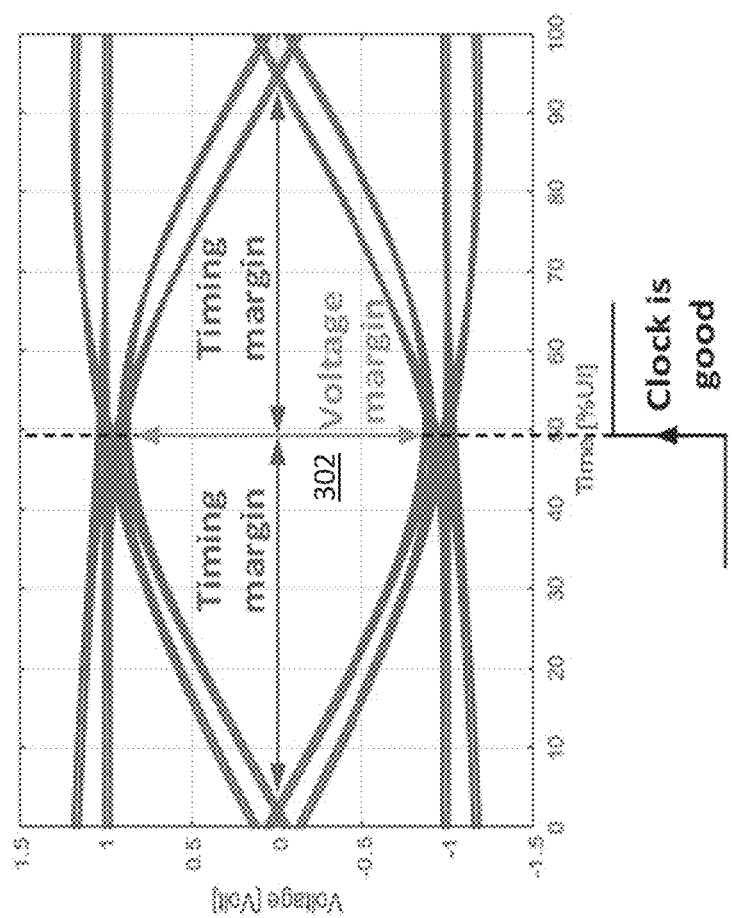
FIG. 3 is a diagram illustrating a preferred clock sampling position on a telecommunication eye diagram, according to an embodiment.

FIG. 3 is a diagram illustrating a preferred clock sampling position on a telecommunication eye diagram, according to an embodiment. The clock sampling position is shown at approximately 50% UI, which demonstrates a preferred maximum timing margin from the start and end of an "eye" 302 in the x-domain and an preferred maximum voltage margin within the "eye" 302 in the y-domain.

The present disclosure provides a phase detection technique that uses an integrator on the timing path. A phase detector receives a first sample from the data path ($D_n$), a second sample from the data path ($D_{n+1}$), and a sample from the integrated path ($T_n$), as described in greater detail below with reference to FIG. 4. Each of the received variables may have a value between −1 and 1, but embodiments are not limited thereto.

Figure 4:
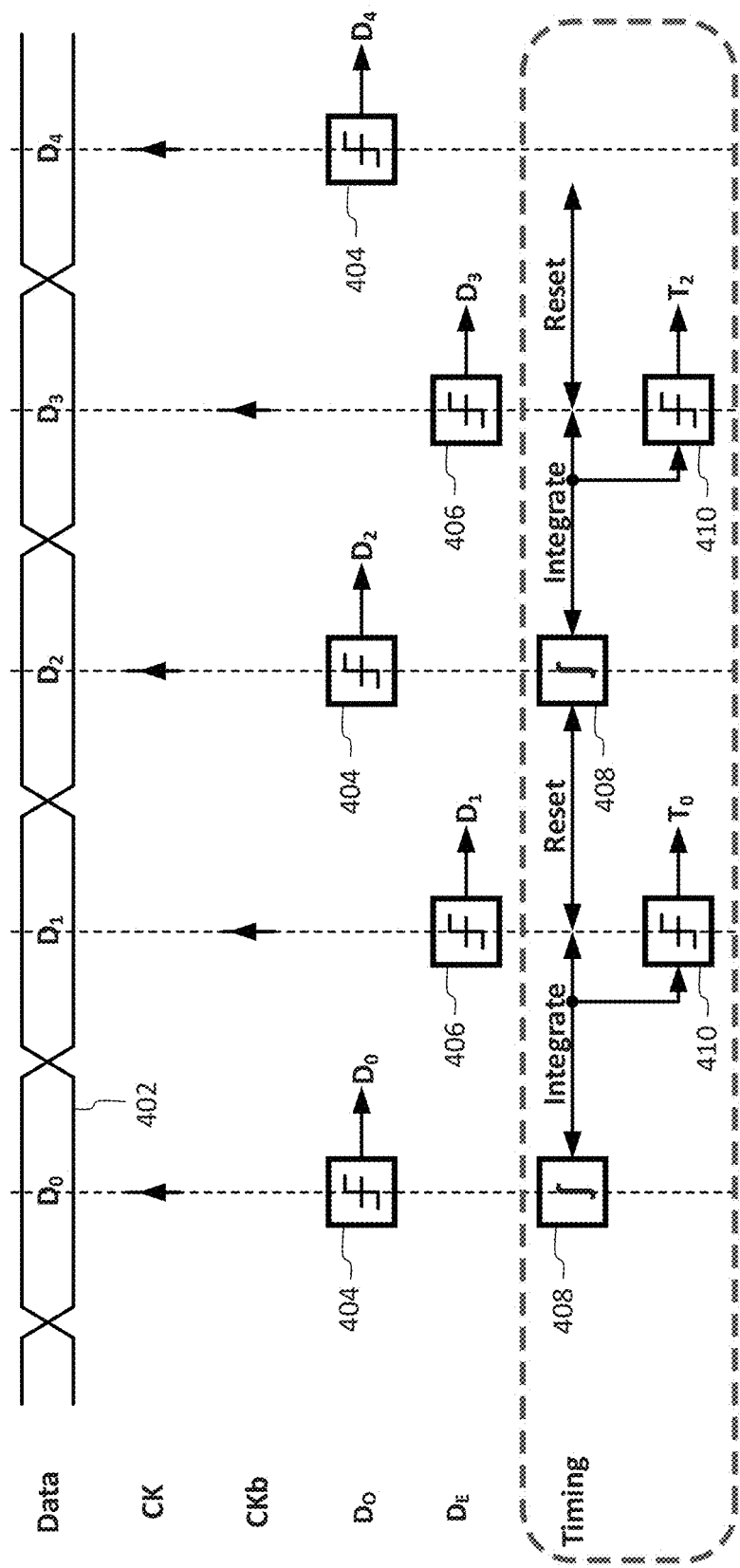
FIG. 4 is a diagram illustrating phase detection, according to an embodiment.

FIG. 4 is a diagram illustrating phase detection, according to an embodiment. A repetitively sampled digital signal 402 is shown, which forms corresponding "eyes". The embodiment of FIG. 4 illustrates a half-rate CDR circuit having two clock sampling positions, however, embodiments are not limited to this rate and other rates may be applied with a different number of clock sampling positions (e.g., quarter-rate).

A first data slicer 404 of a receiver may be triggered by a clock sampling position CK to obtain a first data sample $D_0$ from the digital signal 402, as $D_{Odd}$. A second data slicer 406 of the receiver may be triggered by a clock bar sampling position CKb to obtain a second data sample $D_1$ from the digital signal 402, as $D_{Even}$. An integrator 408 of a phase detector may perform integration on the received signal beginning at CK and ending at CKb, or from $D_0$ to $D_1$, to generate an integrated voltage. The integrated voltage begins at 0 at CK, and a third data slicer 410 of the phase detector may obtain an integrated sample $T_0$ from the integrated voltage at CKb. It may be determined whether CK and CKb have an early, late, or preferred position with respect to the "eye" of the received signal based on a sign of the sample $T_0$, as described in greater detail below with reference to FIGS. 5, 6A, and 6B.

The integrator 408 may be reset after performing the integration so that a subsequent integration may also begin at zero. The first data slicer 404 may be triggered again by CK to obtain a third data sample $D_2$ from the digital signal 402, as $D_{Odd}$. The second data slicer 406 may be triggered again by CKb to obtain a fourth data sample $D_3$ from the digital signal 402, as $D_{Even}$. The integrator 408 may perform integration on the received signal beginning at CK and ending at CKb, or from $D_2$ to $D_3$, to generate an integrated voltage. The third data slicer 410 may obtain a sample $T_2$ from the integrated voltage at CKb. It may be determined whether CK and CKb have an early, late, or preferred position with respect to the "eye" of the received signal based on the sign of the sample $T_2$. The integrator 408 may be reset before triggering the first data slicer 404 to obtain a fifth data sample $D_4$ from the received signal, as $D_{Odd}$.

Figure 5:
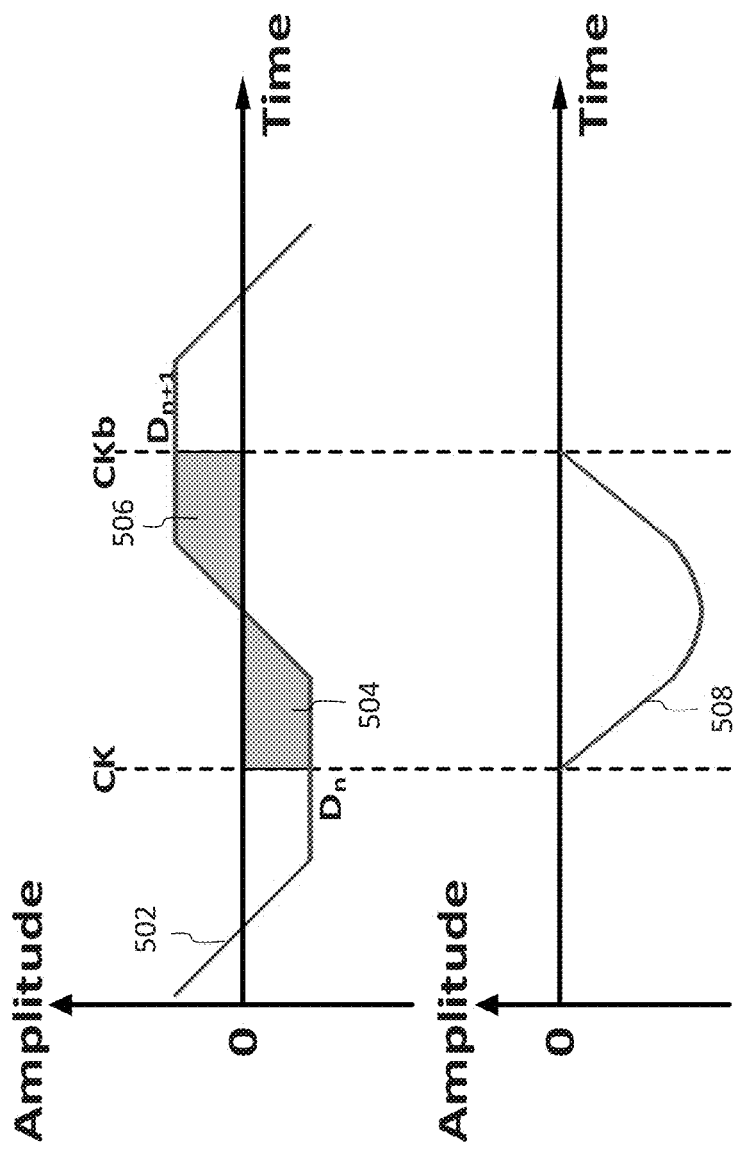
FIG. 5 is a diagram illustrating phase detection with a preferred clock sampling position, according to an embodiment.

FIG. 5 is a diagram illustrating phase detection with a preferred clock sampling position, according to an embodiment. Receiver input 502 is shown with varying amplitude (e.g., between 1 and −1) over time. A first data sample $D_n$ is sampled at a clock sampling position CK having a negative amplitude (e.g., −1), and a second data sample $D_{n+1}$ is sampled at a clock bar sampling position CKb having a positive amplitude (e.g., 1). An first area 504 that is negative between CK and CKb is approximately equal to a second area 506 that is positive between CK and CKb. This is represented in integrator output 508, which is shown with varying amplitude over time. Specifically, the integrator output 508 begins at 0 at CK and returns to 0 at CKb. This results in an integrator output sample of 0 at CKb, representing preferred CK and CKb sampling positions.

Figure 6A:
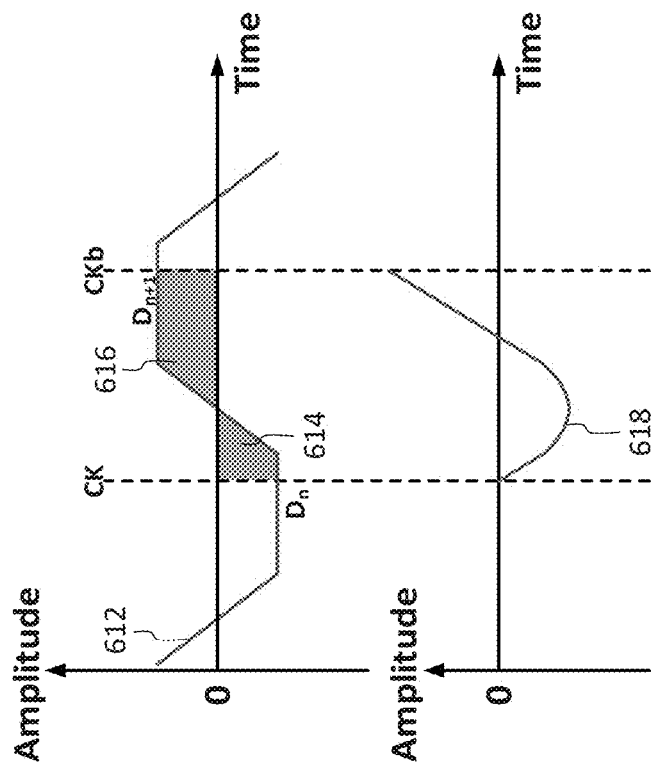
FIG. 6A is a diagram illustrating phase detection with an early clock sampling position, according to an embodiment.

FIG. 6A is a diagram illustrating phase detection with an early clock sampling position, according to an embodiment. Receiver input is shown with varying amplitude (e.g., between 1 and −1) over time. A first data sample $D_n$ is sampled at a clock sampling position CK having a negative amplitude (e.g., −1), and a second data sample $D_{n+1}$ is sampled at a clock bar sampling position CKb having a positive amplitude (e.g., 1). A first area 604 that is negative between CK and CKb is shown to be greater than a second area 606 that is positive between CK and CKb. This is represented in integrator output 608, which is shown with varying amplitude over time. Specifically, the integrator output 608 begins at 0 at CK and maintains a negative value at CKb. This results in a negative integrator output sample at CKb, representing early CK and CKb sampling positions.

Figure 6B:
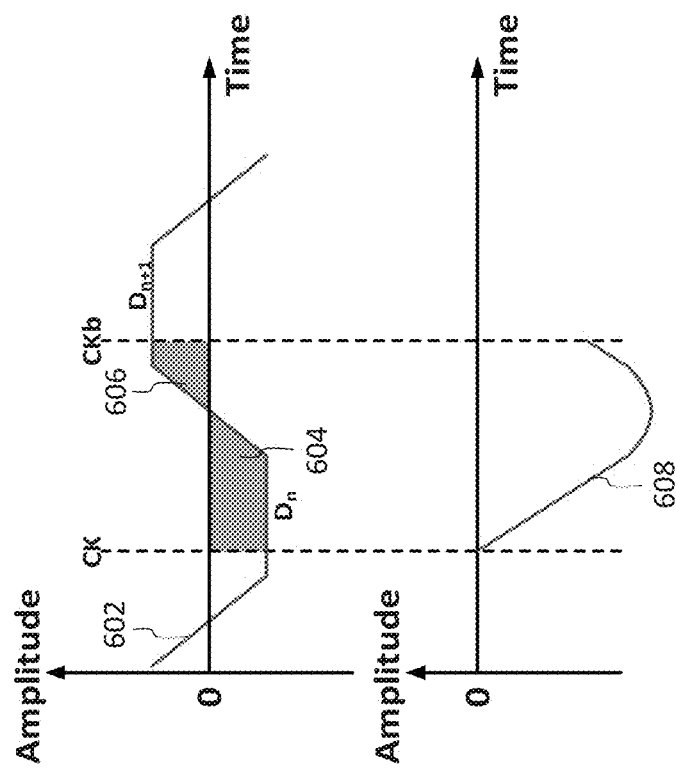
FIG. 6B is a diagram illustrating phase detection with a late clock sampling position, according to an embodiment.

FIG. 6B is a diagram illustrating phase detection with a late clock sampling position, according to an embodiment. Receiver input is shown with varying amplitude (e.g., between 1 and −1) over time. A first data sample $D_n$ is sampled at a clock sampling position CK having a negative amplitude (e.g., −1), and a second data sample $D_{n+1}$ is sampled at a second clock sampling position CKb having a positive amplitude (e.g., 1). A first area 614 that is negative between CK and CKb is shown to be less than a second area 616 that is positive between CK and CKb. This is represented in integrator output 618, which is shown with varying amplitude over time. Specifically, the integrator output begins at 0 at CK and rises to a positive value at CKb. This results in a positive integrator output sample at CKb, representing late CK and CKb sampling positions.

Figure 7:
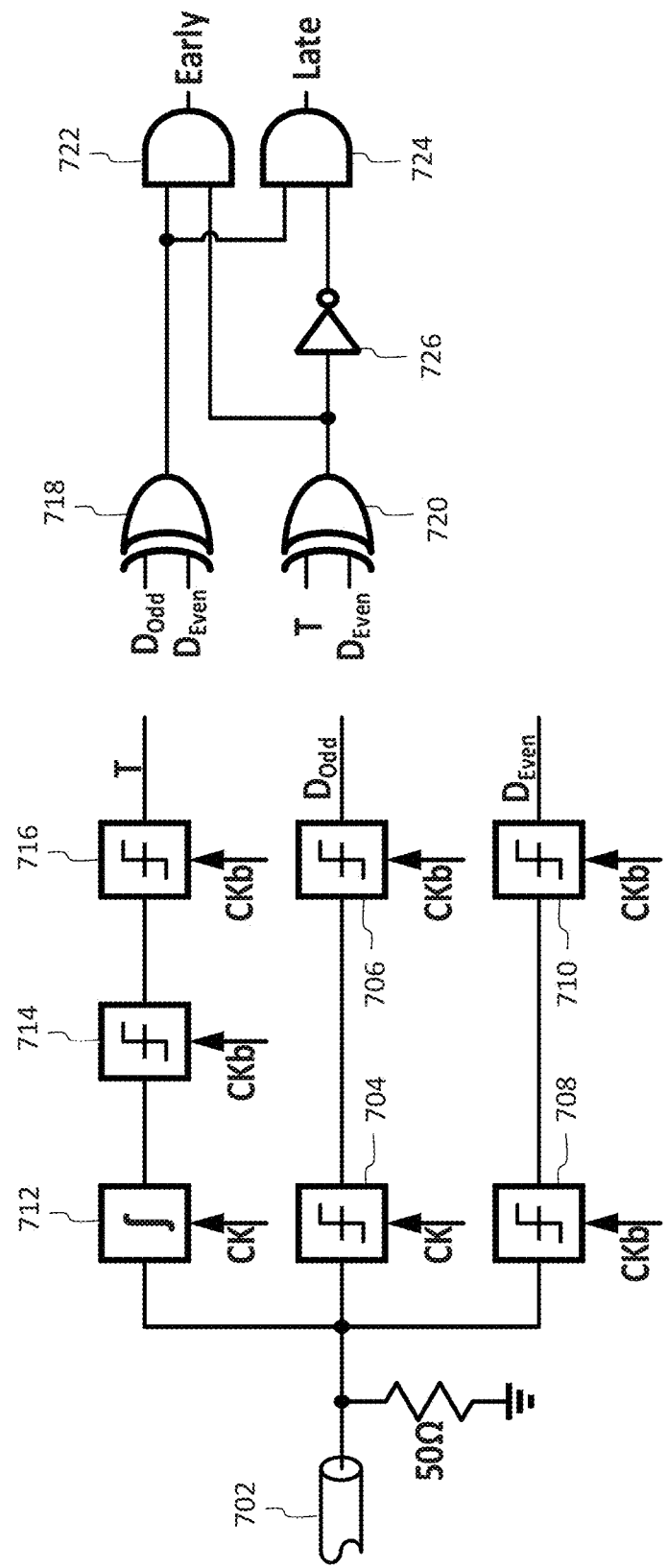
FIG. 7 is a logic diagram illustrating phase detection, according to an embodiment.

FIG. 7 is a logic diagram illustrating phase detection, according to an embodiment. The phase detector determines whether data samples $D_n \ne D_{n+1}$. If they are not equal, this indicates a data transition, and a clock sampling position for $D_n$ and $D_{n+1}$ is determined to be early if the signs of $T_n = D_n$, or the clock sampling position is determined to be late if the signs of $T_n = D_{n+1}$.

As shown in FIG. 7, a data signal may be received at a receiver via link 702. In a first path, a first data slicer 704 may sample the received data signal at a clock sampling position CK, which corresponds to the first data slicer 404 of FIG. 4. A second data slicer 706 may transition the sample into a clock bar sampling position CKb domain, resulting in $D_{Odd}$.

In a second path, a third data slicer 708 may sample the received data signal at CKb, which corresponds to the second data slicer 406 of FIG. 4. A fourth data slicer 710 may maintain the sample in the CKb domain and outputs $D_{Even}$.

In a third path, an integrator 712 may perform integration on the received signal from CK to CKb, which corresponds to the integrator 408 of FIG. 4. A fifth data slicer 714 may sample the integrator output at CKb, which corresponds to the third data slicer 410 of FIG. 4. A fifth data slicer 716 may maintain the sample in the CKb domain and outputs T.

$D_{Odd}$ and $D_{Even}$ may be input to a first exclusive OR (XOR) gate 718. The first XOR gate 718 may output 0 when $D_{Odd}$ and $D_{Even}$ have the same sign and may output 1 when $D_{Odd}$ and $D_{Even}$ have different signs. This represents the determination of whether $D_n \#D_{n+1}$. T and $D_{Even}$ are input to a second XOR gate 720. The second XOR gate 720 may output 0 when T and $D_{Even}$ have the same sign and may output 1 when T and $D_{Even}$ have different signs.

Output from the first XOR gate 718 may be provided to a first AND gate 722 and a second AND gate 724. Output from the second XOR gate 720 may be provided to the first AND gate 722 and a NOT gate (or inverter) 724. The NOT gate 724 outputs a bit opposite that which is input. The output from the NOT gate 724 may be provided to the second AND gate 724. When both values input to the first AND gate 722 are 1, indicating that $D_n \neq D_{n+1}$ and the signs of T and $D_{Even}$ are different, the first AND gate 722 may output 1 indicating that the clock sampling position is early. Additionally, output from the second AND gate is 0. When both values input to the second AND gate 724 are 1, indicating that $D_n \neq D_{n+1}$ and the signs of T and $D_{Even}$ are the same, the second AND gate 724 may output 1 indicating that the clock sampling position is late. Additionally, output from the first AND gate is 0.

Accordingly, in determining whether a clock sampling position is preferred, early, or late, embodiments do not require an extra clock phase, do not require the presence of ISI, do not require a specific transition pattern, do not require a DAC to generate the threshold voltage, and do not require an adaptation loop to find a correct threshold voltage.

Figure 8:
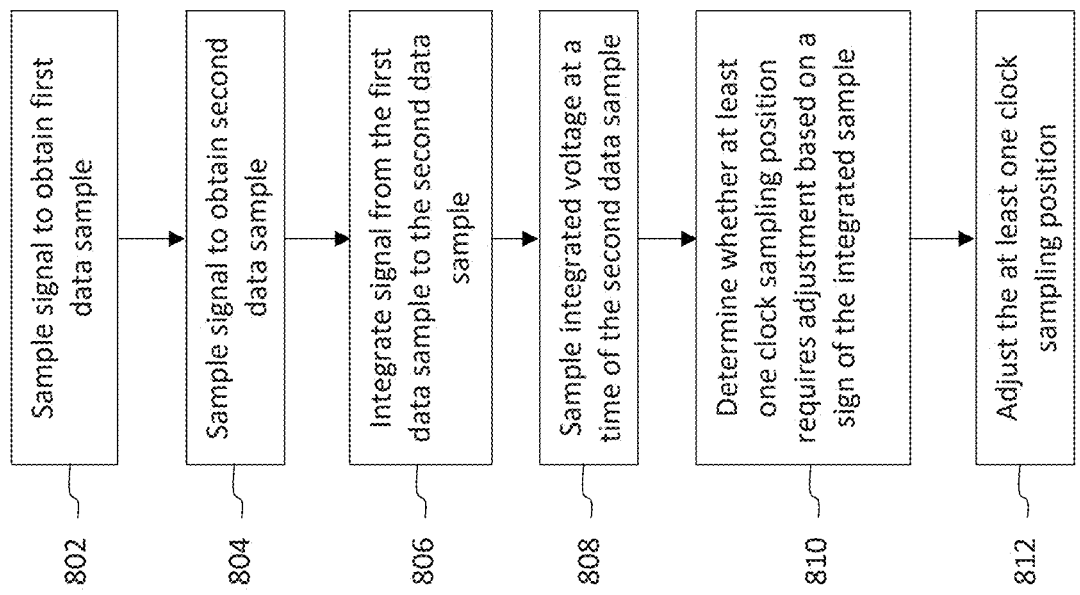
FIG. 8 is a flowchart illustrating method for adjusting a clock sampling position, according to an embodiment.

FIG. 8 is a diagram illustrating method for adjusting a clock sampling position, according to an embodiment. At 802, a signal may be sampled to obtain a first data sample. For example, a first data slicer of a receiver may sample a digital signal at a first clock sampling position. At 804, the signal may be sampled to obtain second data sample. For example, a second data slicer of the receiver may sample the digital signal at a second clock sampling position, or at the same first clock sampling position.

At 806, an integrator of a phase detector of the receiver may integrate the received signal from the first data sample to the second data sample to generate an integrated voltage. The integration may begin at zero at the first data sample. At 808, a third data slicer of the phase detector may sample the integrated voltage at a time of the second data sample to obtain an integrated sample.

At 810, the phase detector may determine whether at least one clock sampling position requires adjustment based on a sign of the integrated sample. The phase detector may determine that the first data sample is not equal to the second data sample. When the integrated sample and the second data sample have the same sign, the at least one clock sampling position may be determined to be late. When the integrated sample and the second data sample have different signs, the at least one clock sampling position may be determined to be early.

At 812, based on the sign of the integrated sample, the phase detector may adjust the at least one clock sampling position to increase a timing margin and a voltage margin.

Figure 9:
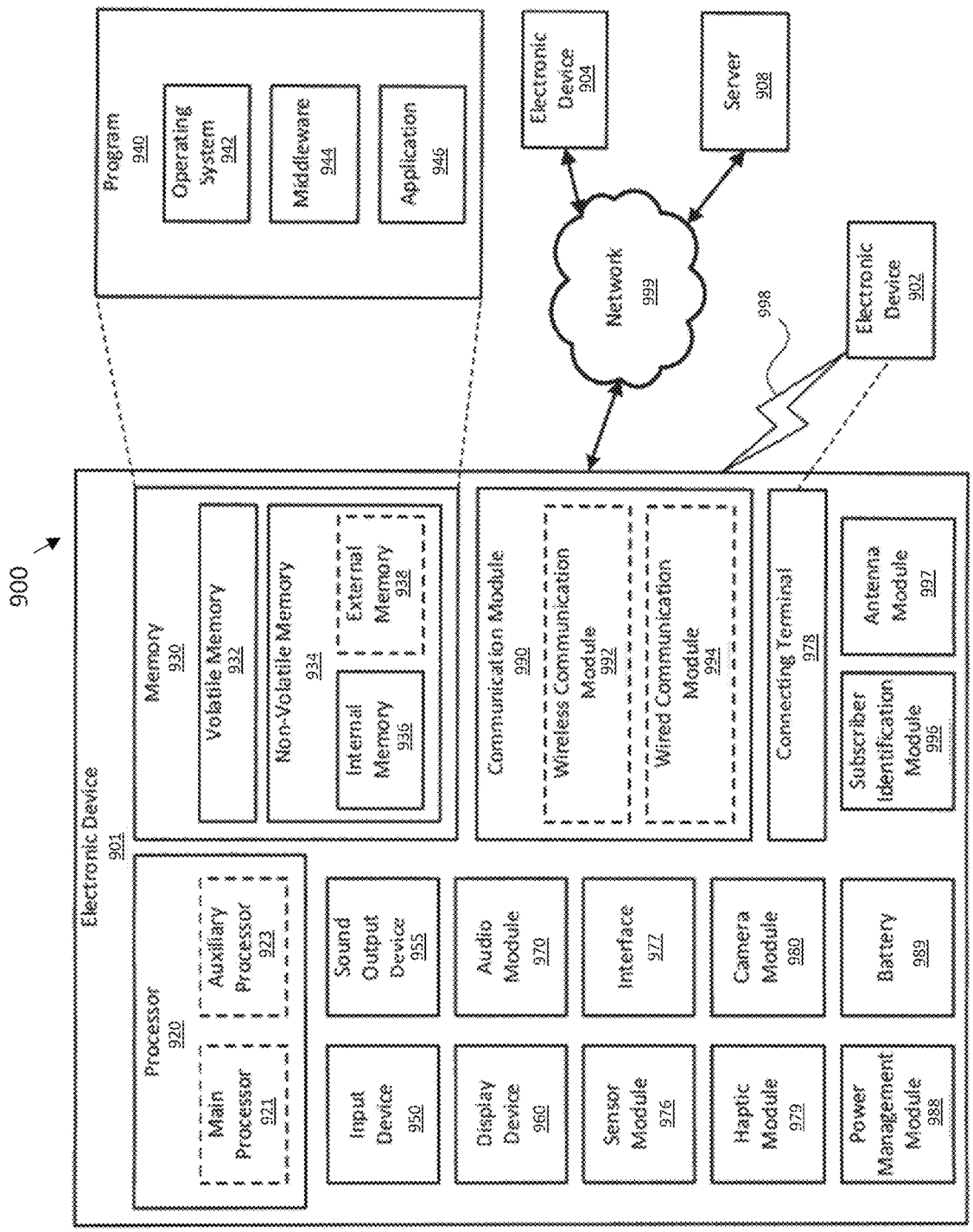
FIG. 9 is a block diagram of an electronic device in a network environment, according to an embodiment.

FIG. 9 is a block diagram of an electronic device in a network environment 900, according to an embodiment.

Referring to FIG. 9, an electronic device 901 in a network environment 900 may communicate with an electronic device 902 via a first network 998 (e.g., a short-range wireless communication network), or an electronic device 904 or a server 908 via a second network 999 (e.g., a long-range wireless communication network). The electronic device 901 may communicate with the electronic device 904 via the server 908. The electronic device 901 may include a processor 920, a memory 930, an input device 950, a sound output device 955, a display device 960, an audio module 970, a sensor module 976, an interface 977, a haptic module 979, a camera module 980, a power management module 988, a battery 989, a communication module 990, a subscriber identification module (SIM) card 996, or an antenna module 997. In one embodiment, at least one (e.g., the display device 960 or the camera module 980) of the components may be omitted from the electronic device 901, or one or more other components may be added to the electronic device 901. Some of the components may be implemented as a single integrated circuit (IC). For example, the sensor module 976 (e.g., a fingerprint sensor, an iris sensor, or an illuminance sensor) may be embedded in the display device 960 (e.g., a display).

The processor 920 may execute software (e.g., a program 940) to control at least one other component (e.g., a hardware or a software component) of the electronic device 901 coupled with the processor 920 and may perform various data processing or computations.

As at least part of the data processing or computations, the processor 920 may load a command or data received from another component (e.g., the sensor module 976 or the communication module 990) in volatile memory 932, process the command or the data stored in the volatile memory 932, and store resulting data in non-volatile memory 934. The processor 920 may include a main processor 921 (e.g., a central processing unit (CPU) or an application processor (AP)), and an auxiliary processor 923 (e.g., a graphics processing unit (GPU), an image signal processor (ISP), a sensor hub processor, or a communication processor (CP)) that is operable independently from, or in conjunction with, the main processor 921. Additionally or alternatively, the auxiliary processor 923 may be adapted to consume less power than the main processor 921, or execute a particular function. The auxiliary processor 923 may be implemented as being separate from, or a part of, the main processor 921.

The auxiliary processor 923 may control at least some of the functions or states related to at least one component (e.g., the display device 960, the sensor module 976, or the communication module 990) among the components of the electronic device 901, instead of the main processor 921 while the main processor 921 is in an inactive (e.g., sleep) state, or together with the main processor 921 while the main processor 921 is in an active state (e.g., executing an application). The auxiliary processor 923 (e.g., an image signal processor or a communication processor) may be implemented as part of another component (e.g., the camera module 980 or the communication module 990) functionally related to the auxiliary processor 923.

The memory 930 may store various data used by at least one component (e.g., the processor 920 or the sensor module 976) of the electronic device 901. The various data may include, for example, software (e.g., the program 940) and input data or output data for a command related thereto. The memory 930 may include the volatile memory 932 or the non-volatile memory 934. Non-volatile memory 934 may include internal memory 936 and/or external memory 938.

The program 940 may be stored in the memory 930 as software, and may include, for example, an operating system (OS) 942, middleware 944, or an application 946.

The input device 950 may receive a command or data to be used by another component (e.g., the processor 920) of the electronic device 901, from the outside (e.g., a user) of the electronic device 901. The input device 950 may include, for example, a microphone, a mouse, or a keyboard.

The sound output device 955 may output sound signals to the outside of the electronic device 901. The sound output device 955 may include, for example, a speaker or a receiver. The speaker may be used for general purposes, such as playing multimedia or recording, and the receiver may be used for receiving an incoming call. The receiver may be implemented as being separate from, or a part of, the speaker.

The display device 960 may visually provide information to the outside (e.g., a user) of the electronic device 901. The display device 960 may include, for example, a display, a hologram device, or a projector and control circuitry to control a corresponding one of the display, hologram device, and projector. The display device 960 may include touch circuitry adapted to detect a touch, or sensor circuitry (e.g., a pressure sensor) adapted to measure the intensity of force incurred by the touch.

The audio module 970 may convert a sound into an electrical signal and vice versa. The audio module 970 may obtain the sound via the input device 950 or output the sound via the sound output device 955 or a headphone of an external electronic device 902 directly (e.g., wired) or wirelessly coupled with the electronic device 901.

The sensor module 976 may detect an operational state (e.g., power or temperature) of the electronic device 901 or an environmental state (e.g., a state of a user) external to the electronic device 901, and then generate an electrical signal or data value corresponding to the detected state. The sensor module 976 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 977 may support one or more specified protocols to be used for the electronic device 901 to be coupled with the external electronic device 902 directly (e.g., wired) or wirelessly. The interface 977 may include, for example, a high-definition multimedia interface (HDMI), a universal serial bus (USB) interface, a secure digital (SD) card interface, or an audio interface.

A connecting terminal 978 may include a connector via which the electronic device 901 may be physically connected with the external electronic device 902. The connecting terminal 978 may include, for example, an HDMI connector, a USB connector, an SD card connector, or an audio connector (e.g., a headphone connector).

The haptic module 979 may convert an electrical signal into a mechanical stimulus (e.g., a vibration or a movement) or an electrical stimulus which may be recognized by a user via tactile sensation or kinesthetic sensation. The haptic module 979 may include, for example, a motor, a piezoelectric element, or an electrical stimulator.

The camera module 980 may capture a still image or moving images. The camera module 980 may include one or more lenses, image sensors, image signal processors, or flashes. The power management module 988 may manage power supplied to the electronic device 901. The power management module 988 may be implemented as at least part of, for example, a power management integrated circuit (PMIC).

The battery 989 may supply power to at least one component of the electronic device 901. The battery 989 may include, for example, a primary cell which is not rechargeable, a secondary cell which is rechargeable, or a fuel cell.

The communication module 990 may support establishing a direct (e.g., wired) communication channel or a wireless communication channel between the electronic device 901 and the external electronic device (e.g., the electronic device 902, the electronic device 904, or the server 908) and performing communication via the established communication channel. The communication module 990 may include one or more communication processors that are operable independently from the processor 920 (e.g., the AP) and supports a direct (e.g., wired) communication or a wireless communication. The communication module 990 may include a wireless communication module 992 (e.g., a cellular communication module, a short-range wireless communication module, or a global navigation satellite system (GNSS) communication module) or a wired communication module 994 (e.g., a local area network (LAN) communication module or a power line communication (PLC) module). A corresponding one of these communication modules may communicate with the external electronic device via the first network 998 (e.g., a short-range communication network, such as BLUETOOTH™, wireless-fidelity (Wi-Fi) direct, or a standard of the Infrared Data Association (IrDA)) or the second network 999 (e.g., a long-range communication network, such as a cellular network, the Internet, or a computer network (e.g., LAN or wide area network (WAN)). These various types of communication modules may be implemented as a single component (e.g., a single IC), or may be implemented as multiple components (e.g., multiple ICs) that are separate from each other. The wireless communication module 992 may identify and authenticate the electronic device 901 in a communication network, such as the first network 998 or the second network 999, using subscriber information (e.g., international mobile subscriber identity (IMSI)) stored in the subscriber identification module 996.

The communication module 990 may include a receiver having a phase detector, a CDR, and data slicers, as shown and described with respect to FIGS. 1, 4 and 7.

The antenna module 997 may transmit or receive a signal or power to or from the outside (e.g., the external electronic device) of the electronic device 901. The antenna module 997 may include one or more antennas, and, therefrom, at least one antenna appropriate for a communication scheme used in the communication network, such as the first network 998 or the second network 999, may be selected, for example, by the communication module 990 (e.g., the wireless communication module 992). The signal or the power may then be transmitted or received between the communication module 990 and the external electronic device via the selected at least one antenna.

Commands or data may be transmitted or received between the electronic device 901 and the external electronic device 904 via the server 908 coupled with the second network 999. Each of the electronic devices 902 and 904 may be a device of a same type as, or a different type, from the electronic device 901. All or some of operations to be executed at the electronic device 901 may be executed at one or more of the external electronic devices 902, 904, or 908. For example, if the electronic device 901 should perform a function or a service automatically, or in response to a request from a user or another device, the electronic device 901, instead of, or in addition to, executing the function or the service, may request the one or more external electronic devices to perform at least part of the function or the service. The one or more external electronic devices receiving the request may perform the at least part of the function or the service requested, or an additional function or an additional service related to the request and transfer an outcome of the performing to the electronic device 901. The electronic device 901 may provide the outcome, with or without further processing of the outcome, as at least part of a reply to the request. To that end, a cloud computing, distributed computing, or client-server computing technology may be used, for example.

Embodiments of the subject matter and the operations described in this specification may be implemented in digital electronic circuitry, or in computer software, firmware, or hardware, including the structures disclosed in this specification and their structural equivalents, or in combinations of one or more of them. Embodiments of the subject matter described in this specification may be implemented as one or more computer programs, i.e., one or more modules of computer-program instructions, encoded on computer-storage medium for execution by, or to control the operation of data-processing apparatus. Alternatively or additionally, the program instructions can be encoded on an artificially-generated propagated signal, e.g., a machine-generated electrical, optical, or electromagnetic signal, which is generated to encode information for transmission to suitable receiver apparatus for execution by a data processing apparatus. A computer-storage medium can be, or be included in, a computer-readable storage device, a computer-readable storage substrate, a random or serial-access memory array or device, or a combination thereof. Moreover, while a computer-storage medium is not a propagated signal, a computer-storage medium may be a source or destination of computer-program instructions encoded in an artificially-generated propagated signal. The computer-storage medium can also be, or be included in, one or more separate physical components or media (e.g., multiple CDs, disks, or other storage devices). Additionally, the operations described in this specification may be implemented as operations performed by a data-processing apparatus on data stored on one or more computer-readable storage devices or received from other sources.

While this specification may contain many specific implementation details, the implementation details should not be construed as limitations on the scope of any claimed subject matter, but rather be construed as descriptions of features specific to particular embodiments. Certain features that are described in this specification in the context of separate embodiments may also be implemented in combination in a single embodiment. Conversely, various features that are described in the context of a single embodiment may also be implemented in multiple embodiments separately or in any suitable subcombination. Moreover, although features may be described above as acting in certain combinations and even initially claimed as such, one or more features from a claimed combination may in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described herein. Other embodiments are within the scope of the following claims. In some cases, the actions set forth in the claims may be performed in a different order and still achieve desirable results. Additionally, the processes depicted in the accompanying figures do not necessarily require the particular order shown, or sequential order, to achieve desirable results. In certain implementations, multitasking and parallel processing may be advantageous.

As will be recognized by those skilled in the art, the innovative concepts described herein may be modified and varied over a wide range of applications. Accordingly, the scope of claimed subject matter should not be limited to any of the specific exemplary teachings discussed above, but is instead defined by the following claims.

What is claimed is:

1. A method comprising:
   sampling, by at least one data slicer of a receiver, a signal based on a clock sampling position to obtain a first data sample and a second data sample;
   integrating, at an integrator of the receiver, the signal from the first data sample to the second data sample to generate an integrated voltage;
   sampling, by a first data slicer of the receiver, the integrated voltage at a time of the second data sample to obtain an integrated sample; and
   determining, by a phase detector of the receiver, whether the clock sampling position requires adjustment based on a sign of the integrated sample.

2. The method of claim 1, further comprising:
   based on the sign of the integrated sample, adjusting, by the phase detector, the clock sampling position to increase a timing margin and a voltage margin.

3. The method of claim 1, wherein sampling the signal comprises:
   sampling, by a second data slicer of the receiver, the signal at a first clock sampling position to obtain the first data sample; and
   sampling, by a third data slicer of the receiver, the signal at a second clock sampling position to obtain the second data sample.

4. The method of claim 3, wherein determining whether the clock sampling position requires adjustment comprises:
   determining, by the phase detector, that the first data sample is not equal to the second data sample; and
   determining, by the phase detector, that the integrated sample and the second data sample have a same sign, indicating that the first and second clock sampling positions are late.

5. The method of claim 3, wherein determining whether the clock sampling position requires adjustment comprises:
   determining, by the phase detector, that the first data sample is not equal to the second data sample; and
   determining, by the phase detector, that the integrated sample and the second data sample have different signs, indicating that the first and second clock sampling positions are early.

6. The method of claim 1, wherein the integrating begins at zero at the first data sample.

7. The method of claim 1, further comprising resetting the integrator to zero for a subsequent integration.

8. The method of claim 1, wherein determining whether the clock sampling position requires adjustment is performed independent of a data transmission pattern, inter-symbol interference (ISI), and an additional clock phase.

9. An apparatus comprising:
   at least one data slicer configured to sample a signal based on a clock sampling position to obtain a first data sample and a second data sample;

an integrator configured to integrate the signal from the first data sample to the second data sample to generate an integrated voltage;

a first data slicer configured to sample the integrated voltage at a time of the second data sample to obtain an integrated sample; and a phase detector configured to determine whether the clock sampling position requires adjustment based on a sign of the integrated sample.

10. The apparatus of claim 9, wherein, based on the sign of the integrated sample, the phase detector is further configured to adjust the clock sampling position to increase a timing margin and a voltage margin.

11. The apparatus of claim 9, wherein the at least one data slicer comprises:

a second data slicer configured to sample the signal at a first clock sampling position to obtain the first data sample; and a third data slicer configured to sample the signal at a second clock sampling position to obtain the second data sample.

12. The apparatus of claim 11, wherein, in determining whether the clock sampling position requires adjustment, the phase detector is configured to:

determine that the first data sample is not equal to the second data sample; and determine that the integrated sample and the second data sample have a same sign, indicating that the first and second clock sampling positions are late.

13. The apparatus of claim 11, wherein, in determining whether the clock sampling position requires adjustment, the phase detector is configured to:

determine that the first data sample is not equal to the second data sample; and determine that the integrated sample and the second data sample have different signs, indicating that the first and second clock sampling positions are early.

14. The apparatus of claim 9, wherein the integrator begins integration at zero at the first data sample.

15. The apparatus of claim 9, wherein the phase detector is further configured to reset the integrator to zero for a subsequent integration.

16. The apparatus of claim 9, wherein the phase detector determines whether the clock sampling position requires adjustment independent of a data transmission pattern, inter-symbol interference (ISI), and an additional clock phase.

17. An apparatus comprising:

a processor; and a non-transitory computer readable storage medium storing instructions that, when executed, cause the processor to:

sample a signal based on a clock sampling position to obtain a first data sample and a second data sample;

integrate the signal from the first data sample to the second data sample to generate an integrated voltage;

sample the integrated voltage at a time of the second data sample to obtain an integrated sample;

determine whether the clock sampling position requires adjustment based on a sign of the integrated sample; and adjust the clock sampling position to increase a timing margin and a voltage margin.

18. The apparatus of claim 17, wherein, in sampling the signal, the instructions further cause the processor to:

sample the signal at a first clock sampling position to obtain the first data sample; and sample the signal at a second clock sampling position to obtain the second data sample.

19. The apparatus of claim 18, wherein, in determining whether the clock sampling position requires adjustment, the instructions further cause the processor to:

determining that the first data sample is not equal to the second data sample; and determine that the integrated sample and the second data sample have a same sign, indicating that the first and second clock sampling positions are late.

20. The apparatus of claim 18, wherein, in determining whether the clock sampling position requires adjustment, the instructions further cause the processor to:

determining that the first data sample is not equal to the second data sample; and determine that the integrated sample and the second data sample have different signs, indicating that the first and second clock sampling positions are early.

* * * * *